March 17, 1970
JAMES E. WEBB
3,501,112
ADMINISTRATOR OF THE NATIONAL AERONAUTICS
AND SPACE ADMINISTRATION
SEALED SEPARABLE CONNECTION
Filed Sept. 15, 1967
2 Sheets-Sheet 1
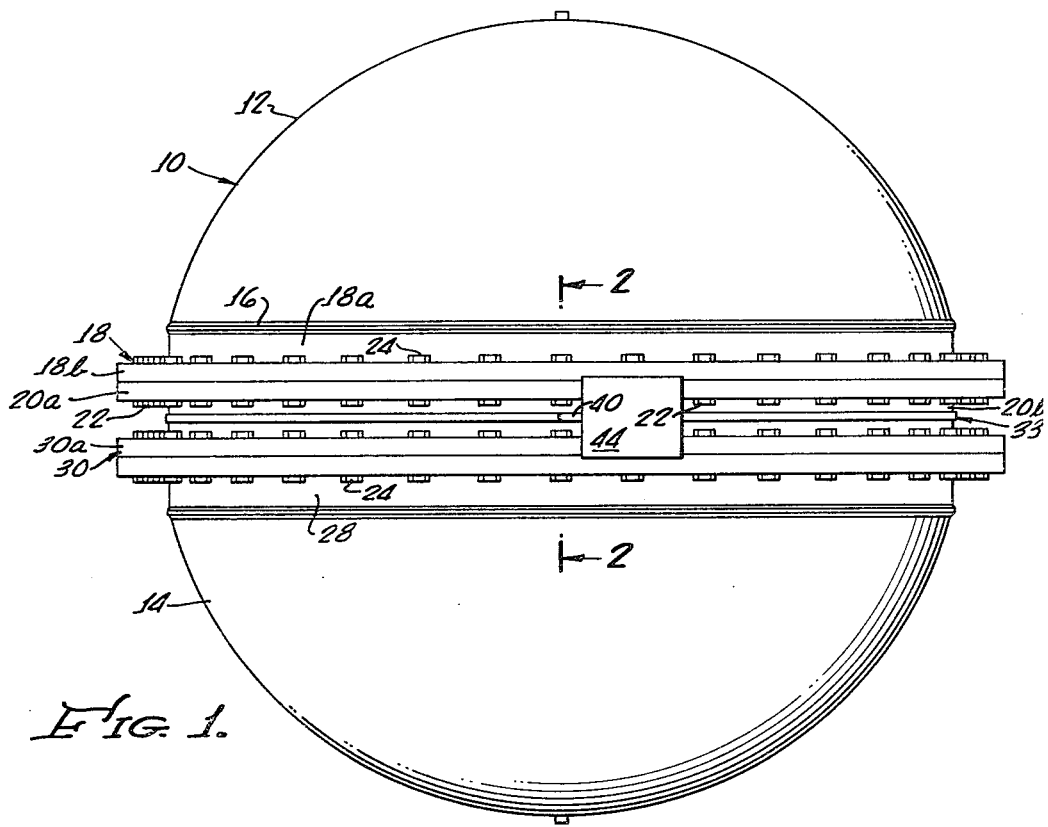
FIG. 1.
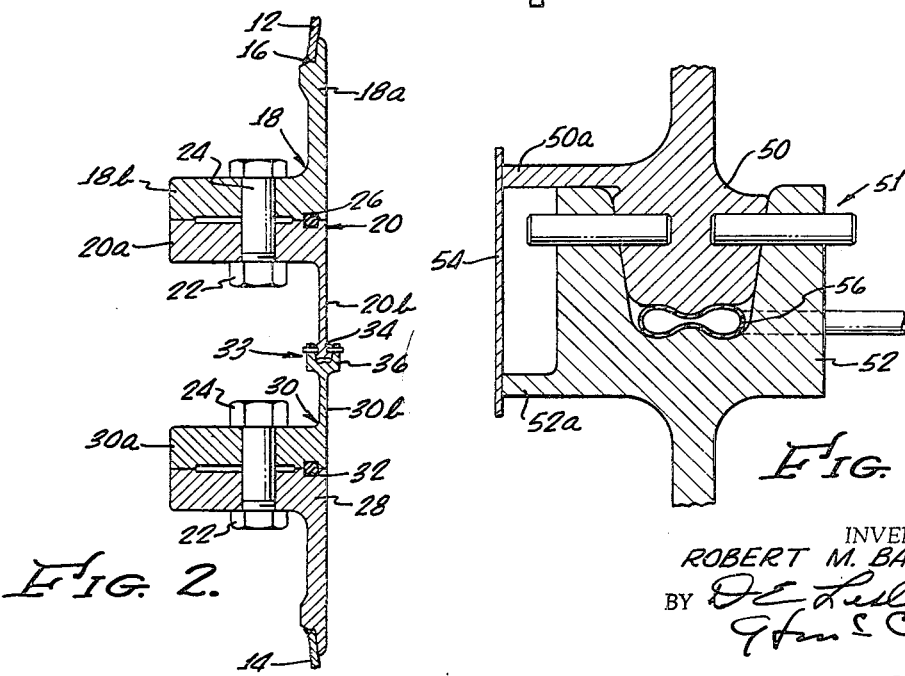
FIG. 2.
FIG. 6.
INVENTOR.
ROBERT M. BAMFORD
BY
ATTORNEYS.

INVENTOR.
ROBERT M. BAMFORD

ATTORNEYS.

United States Patent Office 3,501,112
Patented Mar. 17, 1970

3,501,112
SEALED SEPARABLE CONNECTION
James E. Webb, Administrator of the National Aeronautics and Space Administration, with respect to an invention of Robert M. Bamford, Los Angeles, Calif.
Filed Sept. 15, 1967, Ser. No. 668,755
Int. Cl. B64g 9/00
U.S. Cl. 244—1            3 Claims

ABSTRACT OF THE DISCLOSURE

A thin wall metal tube is collapsed between mating edges of two connectors to provide a sealed joint. By applying high pressure fluid to the sealed interior of the tube, the tube expands to sever the means joining the connectors and hence separates the connector members.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a sealed connection which is quickly separable and particularly useful as a continuous seal between two sections of a container.

There are a variety of situations wherein it is desirable to have a sealed connection which is rapidly separated by a force triggered from a location remote from the connection. In recent years the need for such a connection has arisen in the field of space exploration. As one example, it is desirable that instrument packages or other space capsules which are fired from earth toward other planets or the moon be completely sterile, hence reducing the rick that the package will contaminate the body being studied. As one means of protecting the sterility of a package during its flight from earth through the surrounding atmosphere, the package may be enclosed in a sterile container which is sealed and which provides a biological barrier to contamination during the flight away from earth. Once the container is beyond the earth's atmosphere, it must be opened so that only the capsule or package will land on the target.

Accordingly, it is necessary that the container enclosing the instrument package be sealed and separable at the proper time in response to an appropriate signal. The seal must be highly reliable to handle the pressures involved and to provide an adequate biological barrier. The separating means should be capable of rendering ineffective the means utilized to join the two sections of the container. It is, of course, also desirable that the structure be relatively lightweight and easy to assemble.

SUMMARY OF THE INVENTION

In accordance with this invention, a collapsible tube is employed as the primary sealing element and as the primary separating means. The tube is collapsed between the mating edges of two connector members, which in the example discussed above might be connected to sections of a container. The two members are connected by suitable means so that the tube is compressed between the mating edges to provide the necessary seal.

When it is desired to break the seal and separate the connector members, high pressure fluid is supplied to a sealed interior passage within the tube causing the tube to expand and render the connecting means ineffective so that the connector members are quickly separated.

In a preferred example of the invention, one of the connector members is formed with a continuous female edge portion while the other is formed with a continuous male portion which fits within the female portion. Retaining pins extend transversely through the legs of the female portion into the male portion to secure the connector members together while the collapsible tube is compressed between the male and female portions. As the tube is expanded, the force produced shears the retaining pins.

In another embodiment of the invention wherein the connection is used on a container, the connector members may be each further provided with an outwardly extending annular flange. A sealing band or strip is positioned around the flanges and attached to the outer edges of the flange to provide a secondary biological seal for the container.

DETAILED DESCRIPTION AND DRAWINGS

For a more thorough understanding of the invention refer now to the following detailed description and drawings wherein:

FIG. 1 is a side elevational view of a substantially spherical container joined by the continuous separable connection of the invention;

FIG. 2 is a cross-sectional view taken generally along line 2—2 of FIG. 1 illustrating the connector members attached to the two halves of the container and joined to each other;

FIG. 6 is an enlarged cross-sectional view of a second embodiment of the connection which includes a secondary seal.

Figure 3:
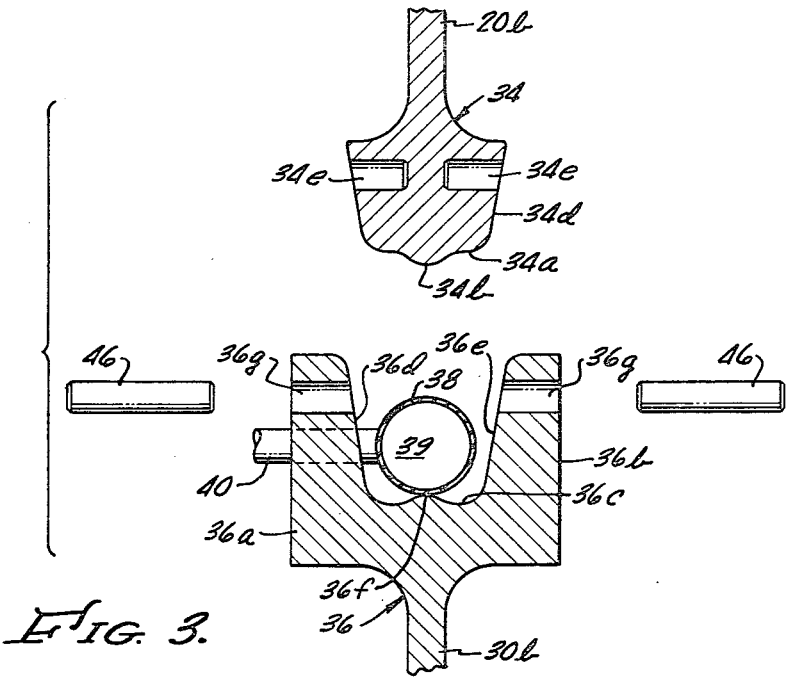
FIG. 3 is an enlarged, exploded sectional view of the continuous separable connection components.

There is shown in FIG. 1, a substantially spherical container 10 having a thin wall upper section 12 and a mating lower section 14. As can be seen from FIG. 2, the upper section 12 is secured, such as by welding at an annular joint 16, to the upwardly extending annular or ring-shaped leg 18a of a flange member 18, which also has an outwardly extending heavy annular leg or flange 18b. This flange 18b mates with a similar flange 20a which is formed on the upper portion of an upper ring-shaped connector member 20 which forms a portion of the container wall. The two outwardly extending flanges 18b and 20a are joined by a plurality of nuts 22 and bolts 24 vertically extending through spaced, vertically oriented holes in the flanges. Each of the flanges is formed with a mating annular recess for receiving an O-ring 26 that seals the joint formed by the flanges.

The lower section 14 of the container 10 is similarly welded to a flange member 28 that is identical to the upper flange member 18. It is attached by a plurality of nuts 22 and bolts 24 to an outwardly extending flange 30a formed on a lower ring-shaped connector member 30. These two lower flanges are also formed with a mating recess for receiving an O-ring 32 which seals the joint formed by the flanges. The lower connector member 30 is formed with an upwardly extending thin walled section 30b which is aligned with the vertical wall 20b of the upper connector member 20.

Figure 4:
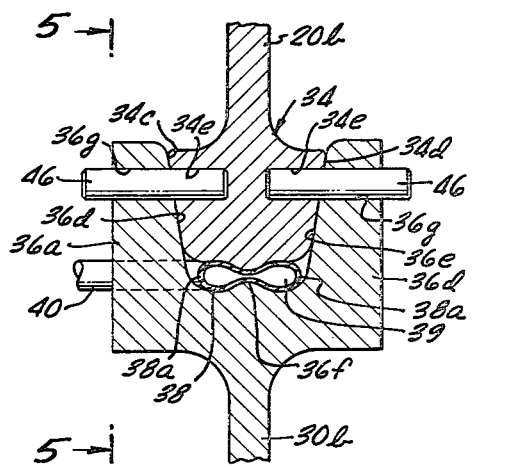
FIG. 4 is an enlarged cross-sectional view of the connector of FIG. 2.
Figure 5:
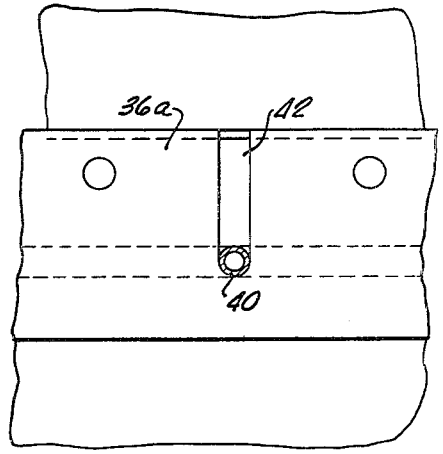
FIG. 5 is a fragmentary elevational view of the exterior of the connection taken generally on line 5—5 of FIG. 4 and showing the inlet to the collapsible tube.

Referring now to FIGS. 3-5 as well as FIG. 2, it may be seen that the connection 30 of the invention includes an enlarged depending annular projection 34 on the lower end of the vertical wall 20a of the upper connector member 20. This enlarged projection 34 forms a continuous male portion of the mating edge between the connectors 20 and 30. The lower edge or wall 34a of the male portion 34 is formed with a depending annular protuberance 34b extending towards the other connector member 30. The side walls 34c and 34d of the male portion 34 are tapered to converge downwardly toward the lower wall 34a, having a somewhat inverted frusto-conical cross-section. As seen in FIGS. 3 and 5, there are formed a plurality of sockets 34e which are circumferentially spaced and extend laterally or transversely into the side walls 34c and 34d of the male portion 34 of the connector 20.

The lower connector member 30 is formed with an upwardly extending female portion 36 for receiving the depending male portion 34. The female portion 36 is an enlarged annular projection having a generally U-shaped cross-section with a pair of upwardly extending legs 36a and 36b and a lower wall 36c connecting the legs. As can be seen from FIG. 4, the vertical depth of the female portion 36 is slightly greater than the vertical depth of the male portion 34. In inner side walls 36d and 36e of the legs of the female portion are tapered to converge downwardly to mate with the side walls 34c and 34d of the male portion 34. An upwardly extending annular protuberance 36f is formed on the wall 36c in the bottom of the female portion 36 opposing the depending protuberance 34b on the male portion 34. The dimensions of the side walls 36d and 36e, and the walls 34d and 34e of the male and female portions is such that these protuberances 34b and 36f are spaced slightly when the male portion is fully inserted.

The legs 36a and 36b of the female portion 36 of the connector are provided with a plurality of openings 36g which are circumferentially spaced and which extend laterally or transversely through the legs. When the male portion 34 is fully inserted in the female portion, the openings 36g in the legs are aligned with the sockets 34e in the side walls 34c and 34d of the male portion 34 as can be seen in FIG. 4.

In accordance with the invention, there is provided a thin walled collapsible tube 38, i.e. of metal, having an annular shape and a cross-sectional diameter to fit within the bottom of the U-shaped female portion 36 of the connector as can be seen in FIG. 3. This tube defines a sealed interior passage 39 having an inlet conduit 40 which extends outwardly from the tube through a vertically oriented slot 42 in the outer leg 36a of the connector female portion 36 as can be seen in FIG. 5. This conduit is connected to a source of high pressure fluid which is schematically illustrated in FIG. 1 by the box 44 mounted on the exterior of the container 10.

It should be understood that various suitable pressure sources may be provided and they may be mounted in different locations from that illustrated, in a manner appropriate for the particular application. The pressure source may be liquid or gaseous, but liquid is preferable because of its faster response time. The box 44 is understood to include means for releasing fluid to the interior of the tube 38. The means may be selectively actuated by a suitable signal from a remote location such as from earth.

In assembly, the depending male projection is inserted into the U-shaped female portion 36 until the side walls of the male and female portions interengage to prevent further movement, as illustrated in FIG. 4. This action collapses the thin walled metal tube 38. The opposing protuberances 34b and 36f on the male and female portions, which remain slightly spaced, compress the tube into the generally FIGURE 8 shaped cross-section. Depending on the strength of the tube 38 and the weight of the container section 12 the tube may be crushed simply by resting the upper component on the lower one. However, with an example of the arrangement illustrated, it has been necessary to provide additional force for full insertion. If desired, the tube may be partially performed into its collapsed state to insure uniform shaping of the tube.

The male portion 34 of the connector 20 is secured or locked in this mated position by a plurality of restraining pins 46 each of which extends transversly through a hole 36g in one of the legs 36a or 36b of the female portion 36 into one of the sockets 34e in the male portion 34. The dimensions and material of the thin walled metal tube 38 are selected such that when the tube is collapsed or crushed in the position of FIG. 4, the tube is approaching the minimum radius of bend permissible without cracking the wall of the tube.

In this regard, care should be taken to prevent cracks in the tube 38 in the area where the conduit 40 intersects the tube. If necessary, to reduce stresses and the possibility of leaking, the male and female portions 34 and 36 may be recessed in the area of the conduit 40 so that the tube 38 is not crushed to the extent shown.

With the connection assembled as shown in FIG. 4, an effective seal is provided along the mating edge of the connector members. If desired the tube may be coated with a suitable substance to further enhance sealing. Note that the FIGURE 8 shape of the tube provides considerable sealing surface between the tube and the male and female portions.

When it is desired to separate the continuous seal, it is only necessary to actuate the fluid pressure source 44 in some suitable manner to supply high pressure fluid through the inlet conduit 40 into the sealed interior of the collapsed tube 38. This fluid pressure causes the tube to quickly expand and provide a separating force substantially perpendicular to the restraining pins 46. This force shears the pins causing the container halves or sections 12 and 14 to be separated.

Naturally, the number and strength characteristics of the restraining pins 46 must be calculated with respect to the separating force which can be provided by the extending tube so that the pins will be quickly sheared. This force is determined by the pressure of the applied fluid and the surface area of the tube.

The diameter of the tube 38 must be great enough so that the difference between its expanded diameter and its collapsed vertical thickness is greater than the diameter of the restraining pins to obtain a sufficient stroke and shearing action. The use of the protuberances 34b and 36f is advantageous in this regard to maximize the expansion stroke of the tube for a given diameter while minimizing the crushing bend angles on the tube. With the arrangement shown the theoretical stroke is the difference between the expanded tube's outer diameter as viewed in FIG. 3 and the distance between the protuberance 34b and 36f when the connector is assembled as viewed in FIG. 4.

By contrast, if the protuberances 34b and 36f were not used and the opposing surfaces 34a and 36c of the male and female portions were simply flat, the edges 38a of the collapsed tube, as shown in FIG. 4, would be subjected to a much greater bend angle to obtain a stroke equal to that obtained with the arrangement shown.

The bend angle of the tube is also related to the wall thickness and material of the tube. For a high force application it is desirable that the tube be of metal for strength and have a thin wall to reduce material surface flow. In one example of the invention, a stainless steel tube was employed having a diameter of .200 of an inch and a wall thickness of .007 of an inch. The diameter of the container involved and hence the seal, was about 3 feet. Fluid pressure of approximately 2000 pounds per square inch was used to shear the pins 46 employed.

With the use of the fully enclosed pressure system described, one side of the connector can fail first and yet a positive separation of the entire connector is attained.

The interengaging tapered side walls of the male and female portions are not only advantageous for controlling the insertion of the male portion into the female portion but also during the separating action. Contact and hence frictional force between the mating side walls decreases very quickly with only a small portion of the tube expansion stroke; whereas if the walls were straight-sided or parallel to the separating direction, frictional forces would be greater and would continue until the male and female portions had separated a greater distance and hence the expansion stroke would be more near completion. This would naturally require a greater expansion force.

The importance of the tapered surface, and the resulting decreased frictional forces, can be more fully appreciated in view of other practical considerations such as (1) tolerance variations in large diameter components causing increased friction; (2) temperature variations of the mating components causing different expansion and contraction rates with resulting interference; and (3) time delay in the shearing of the restraining pins 46 causing the container sections to be separated on one side faster than the opposite side, and the resulting tilting causing additional interference between the male and female portions on the slow separating side.

It may be desirable in certain space applications to provide a double seal for the container 10 as a safety margin. Hence as a second embodiment of the invention illustrated in FIG. 6, the upper male portion 50 of the connection 51 illustrated is provided with an outwardly extending annular flange 50a and the lower female portion 52 is similarly provided with an outwardly extending continuous annular flange 52a. After the connection of the male and female portions 50 and 52 is made, a strip 54, e.g. of foil, having a height slightly greater than the distance between the two flanges 50a and 52a is placed in position surrounding the sealed connection 51 and engaging the outer edges of the flanges. The strip is cemented in place in this position as an additional biological barrier. The expansive force of the primary sealing tube 56 for this embodiment provides sufficient force to break the strip 54 and render this secondary seal ineffective as well as the primary seal provided by the collapsed tube 56.

In the embodiment illustrated in FIG. 6, the inlet conduit 40 extends interior of the spherical container rather than through the sealing strip 54, and the high pressure source is located interior of the container.

While specific embodiments of the invention have been shown and described, the invention is not limited to the particular constructions disclosed.

What is claimed is:

1. A continuous separable sealed connector for use with a container formed in two sections comprising:
   a first annular connector member secured to one section of the container and having a continuous female edge portion with a generally U-shaped cross-section;
   a second annular connector member secured to the other section of the container and having a continuous male edge portion which fits within the U-shaped female portion;
   the axial end of the male edge portion and the bottom of the U-shaped female edge portion having opposing annular protuberances;
   the male edge portion having tapered side walls which engage mating tapered side walls on the legs of the female edge portion;
   the interengagement of the side walls being such that the opposing protuberances are slightly spaced from each other when the male edge portion is fully inserted into the female edge portion;
   an annular tube positioned within the bottom of the female edge portion and collapsed between the male and female portions to seal the joint therebetween, said opposing protuberances engaging the tube to form it into a somewhat FIGURE 8 cross-sectional shape;
   a plurality of restraining pins extending transversly through the legs of the female portion and into the male portion to join the connector members and the container sections as an enclosed unit;
   said tube defining a sealed interior passage and having an inlet conduit extending through a leg of the female portion into the passage;
   a supply of high pressure fluid connected to the inlet conduit; and
   means for selectively applying high pressure fluid from from the supply to said tube passage to expand the tube with sufficient force to shear the restraining pins and thereby separate the connector members of the container sections.

2. A continuous separable connection for joining adjacent container sections, the combination comprising:
   an annular edge attached to a first container section;
   an annular edge attached to a second container section and mated with the edge attached to the first section;
   a continuous flange extended in circumscribing relationship from each of said sections adjacent to the edges thereof;
   an elongated annular tube collapsed between the edges of the adjacent sections forming a hermetic seal therebetween, said tube defining a sealed interior passage;
   retaining means securing one of said adjacent container sections to another section;
   a sealing strip surrounding said flanges and secured to the outer surfaces thereof to form a secondary seal for the container; and
   means for supplying fluid under pressure to the tube passage for expanding the tube for thereby separating the container sections.

3. A separable sealed connection comprising:
   (A) a female connector having a generally U-shaped cross section and including a continuous connector sealing surface defied by a first pair of surface segments separated by a transverse surface segment of a configuration defining a first protuberance extended between the pair of surface segments;
   (B) a male connector mated with said female connector having a tapered cross section and including a continuous connector sealing surface defined by a second pair of surface segments, disposed in juxtaposition with said first pair of surface segments, separated by a transverse surface segment of a configuration defining a second protuberance extended between the segments of the first pair of surface segments in an opposed relationship with said first protuberance;
   (C) an elongated tube, having a sealed internal passage, disposed between the transverse surface segments in mated engagement therewith, said protuberances engaging said tube at opposite sides thereof and serving to deform the tube by displacing portions of opposite internal surfaces of the tube into close proximity for thereby imparting to the tube a cross section configuration substantially conforming to a figure eight;
   (D) means interconnecting said members into a unitary structure having the deformed tube sealingly supported between the transverse segments of the surfaces; and
   (E) means for selectively applying fluid under pressure to said sealed passage for expanding the tube, whereby the tube is caused to assume a cross section configuration substantially conforming to a circle for thereby effecting separation of the protuberances of the transverse segments and achieving maximized separation of the connectors.

References Cited

UNITED STATES PATENTS

| 2,612,333 | 9/1952 | Wood | 244—121 |
| 3,174,706 | 3/1965 | Wagner | 244—1 |
| 2,952,276 | 9/1960 | Warman | 92—92 |
| 3,032,356 | 5/1962 | Botsford | 285—3 |
| 3,362,290 | 1/1968 | Carr et al. | 285—3 |

FERGUS S. MIDDLETON, Primary Examiner

U.S. Cl. X.R.

92—92; 102—49.4